US006256050B1

(12) United States Patent
Iwayama et al.

(10) Patent No.: US 6,256,050 B1
(45) Date of Patent: Jul. 3, 2001

(54) INK TRANSFER PRINTER

(75) Inventors: Takemi Iwayama, Kanagawa-ken; Minoru Suzuki, Tochigi-ken; Mikio Horie; Hiroshi Orita, both of Saitama-ken; Masahiko Sasaki, Chiba-ken; Katsuyoshi Suzuki, Tokyo, all of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/228,235

(22) Filed: Jan. 11, 1999

(30) Foreign Application Priority Data

Jan. 12, 1998 (JP) ........................................ 10-016324

(51) Int. Cl.[7] .......................................... G01D 15/16

(52) U.S. Cl. ........................... 346/140.1; 347/48; 347/69

(58) Field of Search ........................... 346/140.1; 347/66, 347/48, 171, 68, 69, 56, 54, 20

(56) References Cited

U.S. PATENT DOCUMENTS

| | | | | |
|---|---|---|---|---|
| 3,946,398 | | 3/1976 | Kyser et al. | 347/70 |
| 4,561,789 | * | 12/1985 | Saito | 347/102 |
| 4,731,621 | * | 3/1988 | Hayamizu et al. | 347/66 |
| 5,956,066 | * | 9/1999 | Suzuki | 347/171 |

FOREIGN PATENT DOCUMENTS 53-12138 4/1978 (JP) .

* cited by examiner

*Primary Examiner*—John Barlow
*Assistant Examiner*—Blaise Mouttet
(74) *Attorney, Agent, or Firm*—Greenblum & Berstein, P.L.C.

(57) ABSTRACT

A ink transfer printer includes a thermal head having an array of heating elements, a film having through-holes facing the heating elements, an ink space formed between the thermal head and the film, and a mechanism which brings a recording medium in contact with the film. When the heating element generates heat, the ink is transmitted through the through-hole of the film and is transferred to the recording medium. An ink amount controller is provided in the ink space, which controls the amount of ink transmitted through the through-hole to the recording medium.

19 Claims, 12 Drawing Sheets

INK TRANSFER PRINTER

BACKGROUND OF THE INVENTION

This invention relates to a printer which forms an image on a recording medium with ink.

Conventionally, an ink jet printer is known in the art. The known ink jet printer is constructed to propel ink through a nozzle toward a recording medium such as paper. A gap is provided between the nozzle and the recording medium, so that ink passes through the air to the recording medium.

Due to the existence of the gap between the nozzle and the recording medium, the propelled ink tends to spread when the ink reaches to the recording medium. Thus, in order to obtain an image of high resolution, it is necessary to provide a nozzle having small diameter. However, machining of such a nozzle is not easy.

Further, in order to enhance the printing speed of the ink jet printer, it is preferable to provide a line head including an array of the nozzles. However, if a lot of nozzles are assembled as one array, the structure of the line head may be complicated.

SUMMARY OF THE INVENTION

The present invention provides a simple ink transfer printer capable of printing image of high resolution, and capable of printing an image at a high speed.

According to an aspect of the present invention, there is provided an ink transfer printer including (1) a thermal head including at least an array of heating elements, (2) a film with through-holes facing the heating elements, (3) an ink space formed between the thermal head and the film, and (4) a contact mechanism which brings a recording medium in contact with the film. When the heating element generates heat, the ink is transmitted through the through-hole of the film and is transferred to the recording medium. An ink amount controller is provided in the ink space, which controls the amount of ink transmitted through the through-hole to the recording medium.

With such an arrangement, since the amount of ink transmitted to the recording medium can be controlled, a dot size formed on the recording medium can be precisely controlled. Thus, a density of an image can be controlled. It is advantageous in obtaining an image of high resolution. Further, due to the array of the heating elements and their corresponding through-holes, 'line image' can be printed on the recording medium. Thus, by feeding the recording medium perpendicular to the line image, a two-dimensional image can be formed at a high speed.

In a particular arrangement, the ink amount controller includes a capacity changer which is arranged to change a capacity of the ink space. As the capacity of the ink space is larger, the amount of ink transmitted to the recording medium increases. Alternatively, as the capacity of the ink space oscillates (that is, increases and decreases in short cycles), it increases the flowability of the ink, so that the amount of ink transmitted to the recording medium may increase.

In a further development, the capacity changer includes at least one piezoelectric element. As the dimension (such as a thickness) of the heating element changes, the capacity of the ink space also changes.

It is preferred that the capacity changer includes a plurality of piezoelectric elements, which are arranged along the array of the heating elements of the thermal heads. It is preferred that each of the piezoelectric elements surrounds one heating element. With this configuration, the amount of the ink activated by each heating element is individually controlled. With this configuration, a dot density can be individually controlled. That is, a gradation control is enabled.

In another particular arrangement, the capacity changer decreases the capacity of the ink space as the temperature of the thermal head increases. With such an arrangement, even if the temperature of the thermal head increases and the viscosity of the ink decreases (e.g., after continued use), the amount of the ink transmitted to the recording medium is kept constant (since the capacity of the ink space decreases). It is advantageous in obtaining the image of high resolution.

The capacity changer includes a heat-sensitive member such as bimetal and shape memory alloy. A plurality of heat-sensitive members are arranged along the array of the heating elements of the thermal heads.

In a further development, the ink transfer printer further includes an ink container which supplies ink to the ink space. In such case, the ink amount controller includes an ink supply regulator which changes an amount of ink supplied to the ink space from the ink tank. As the amount of the ink supplied to the ink space increases, the amount of the ink transmitted to the recording medium increases. Alternatively, as the capacity of the ink space oscillates, it increases the flowability of the ink, so that the amount of ink transmitted to the recording medium may increase. By actively controlling the amount of ink supplied to the ink space, the density of the image can be controlled. Optionally, it is preferred that the amount of ink supplied to the ink space decreases as the temperature of the thermal head increases. With this configuration, the amount of the ink transmitted to the recording medium is kept constant, even if the viscosity of the ink decreases (after continued use). It is advantageous in obtaining the image of high resolution.

In a preferred embodiment, the ink supply regulator is provided in the vicinity of an inlet port of ink through which ink is supplied to the ink space. Further, the ink supply regulator deforms so as to change an area through which ink supplied from the inlet port flows in the ink space. The ink supply regulator includes at least one piezoelectric element, or at least one heat-sensitive member such as bimetal.

DESCRIPTION OF THE PREFERRED EMBODIMENT

The embodiments of an ink transfer printer according to the present invention are described below.

First Embodiment

Figure 1:
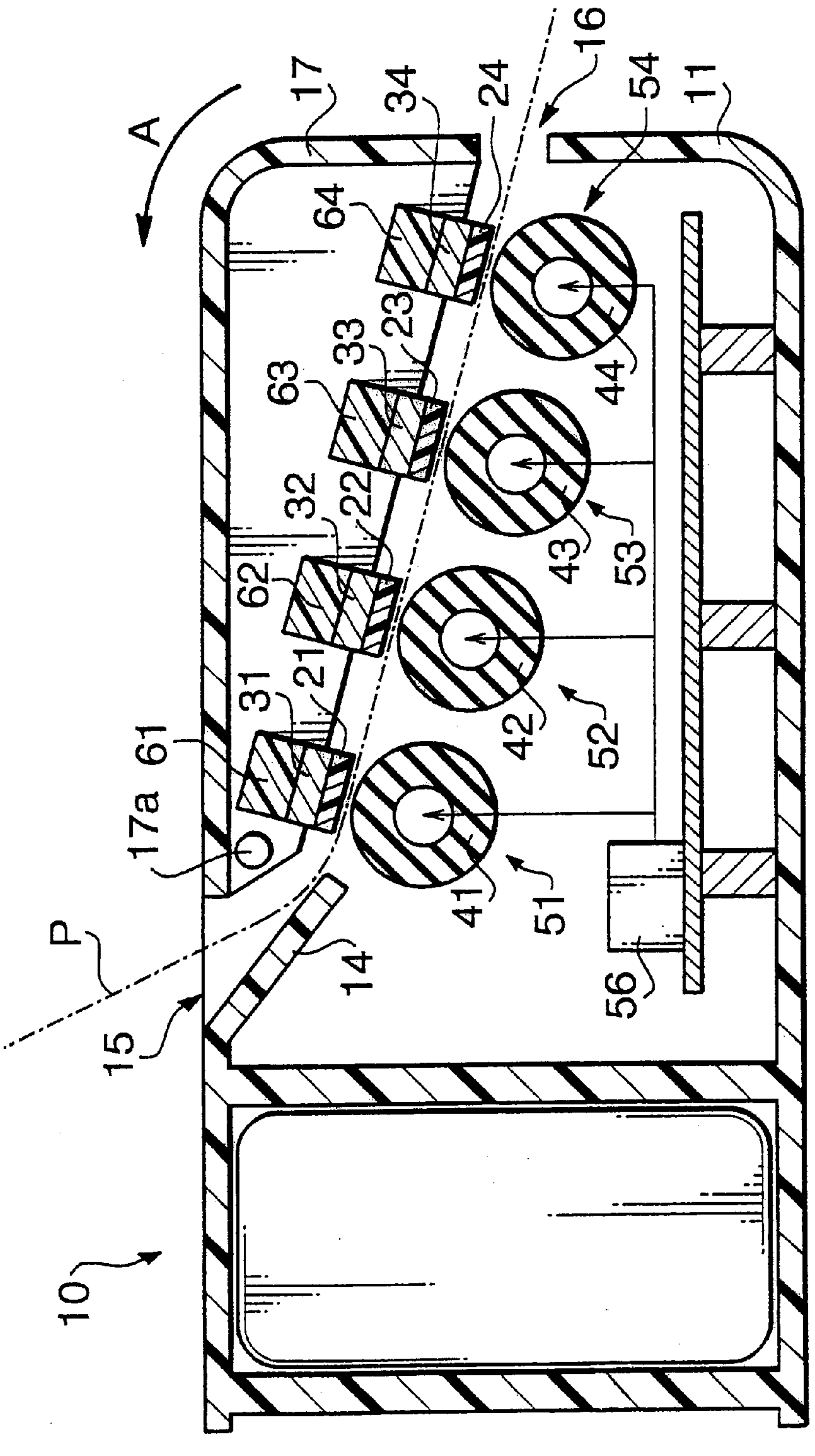
FIG. 1 is a side sectional view showing an ink transfer printer according to a first embodiment of the present invention.

FIG. 1 is a sectional view of a color ink transfer printer (hereinafter, the printer 10) according to the first embodiment.

The printer 10 has four ink transfer units 51, 52, 53 and 54, that respectively form images of yellow (Y), magenta (M), cyan (C), and black (BK) on a recording sheet P. The printer 10 has an elongated rectangular housing 11. The housing 11 has an inlet opening 15 at its top through which the recording sheet P is inserted. The housing 11 also has an outlet opening 16 at the front end (the right side as viewed in FIG. 1), through which the recording sheet P is discharged out of the housing 11. The recording sheet P is carried on a line connecting the inlet opening 15 and the outlet opening 16, which is defined as a sheet feeding path. The ink transfer unit 51, 52, 53 and 54 are arranged along the sheet feeding path. A slope 14 is provided beneath the inlet opening 15 for guiding the recording sheet P to the ink transfer unit 51, 52, 53 and 54.

The ink transfer units 51, 52, 53 and 54 respectively include ink tanks 61, 62, 63 and 64 in which ink of yellow, magenta, cyan, and black are respectively stored. Beneath the ink tanks 61, 62, 63 and 64, thermal heads 31, 32, 33 and 34 are provided. The thermal heads 31, 32, 33 and 34 are so-called 'thermal line heads' respectively including an array of heating elements. The thermal heads 31, 32, 33 and 34 are heated according to image information of yellow, magenta, cyan, and black, thereby to form line-images. Films 21, 22, 23 and 24 are respectively attached to the bottoms of the thermal heads 31, 32, 33 and 34. The platen rollers 41, 42, 43 and 44 are provided at a side opposing to the thermal heads 31, 32, 33 and 34, with respect to the sheet feeding path. The platen rollers 41, 42, 43 and 44 are made of cylindrical rubber rollers which extend in parallel to the arrays of the thermal heads 31, 32, 33 and 34.

The housing 11 includes a swingable cover 17 which constitutes a corner above the sheet feeding path. The swingable cover 17 is swingably supported by a pivoting shaft 17*a* provided at the proximity of the inlet opening 15. The ink tanks 61, 62, 63 and 64, the thermal heads 31, 32, 33 and 34 and the film 21, 22, 23 and 24 are supported by the swingable cover 17. The platen rollers 41, 42, 43 and 44 are supported by the lower part of the housing 11. Thus, by swinging the swingable cover 17, the sheet feeding path can be accessed.

The recording sheet P, which is inserted from the inlet opening 15, is sandwiched between the platen rollers 41, 42, 43 and 44 and the film 21, 22, 23 and 24. The platen rollers 41, 42, 43 and 44 are driven by a motor 56. When the platen rollers 41, 42, 43 and 44 rotate clockwise as viewed in FIG. 1, the recording sheet P is fed toward the outlet opening 16. In order to apply tension to the recording sheet P, the circumferential speed of each platen roller is set faster than that of its upstream adjacent platen roller.

Figure 2:
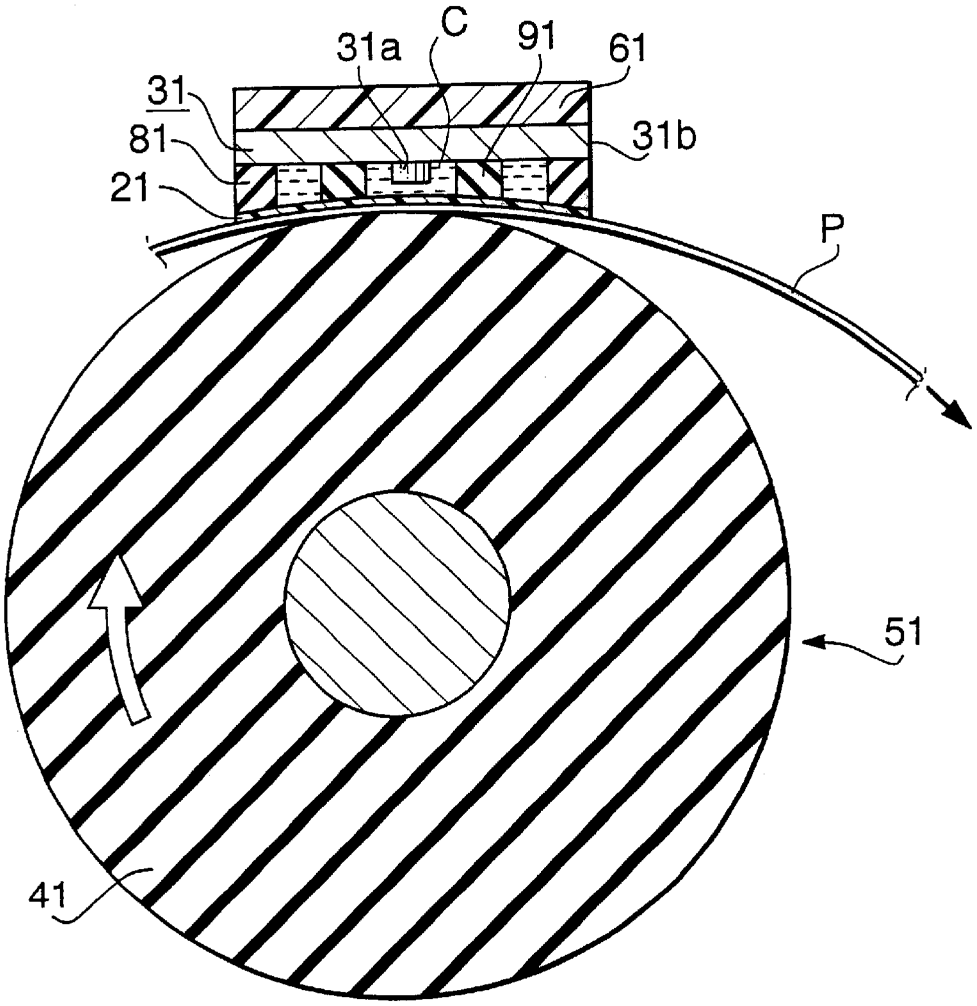
FIG. 2 is an enlarged side view showing an ink transfer unit of the ink transfer printer of FIG. 1.
Figure 3:
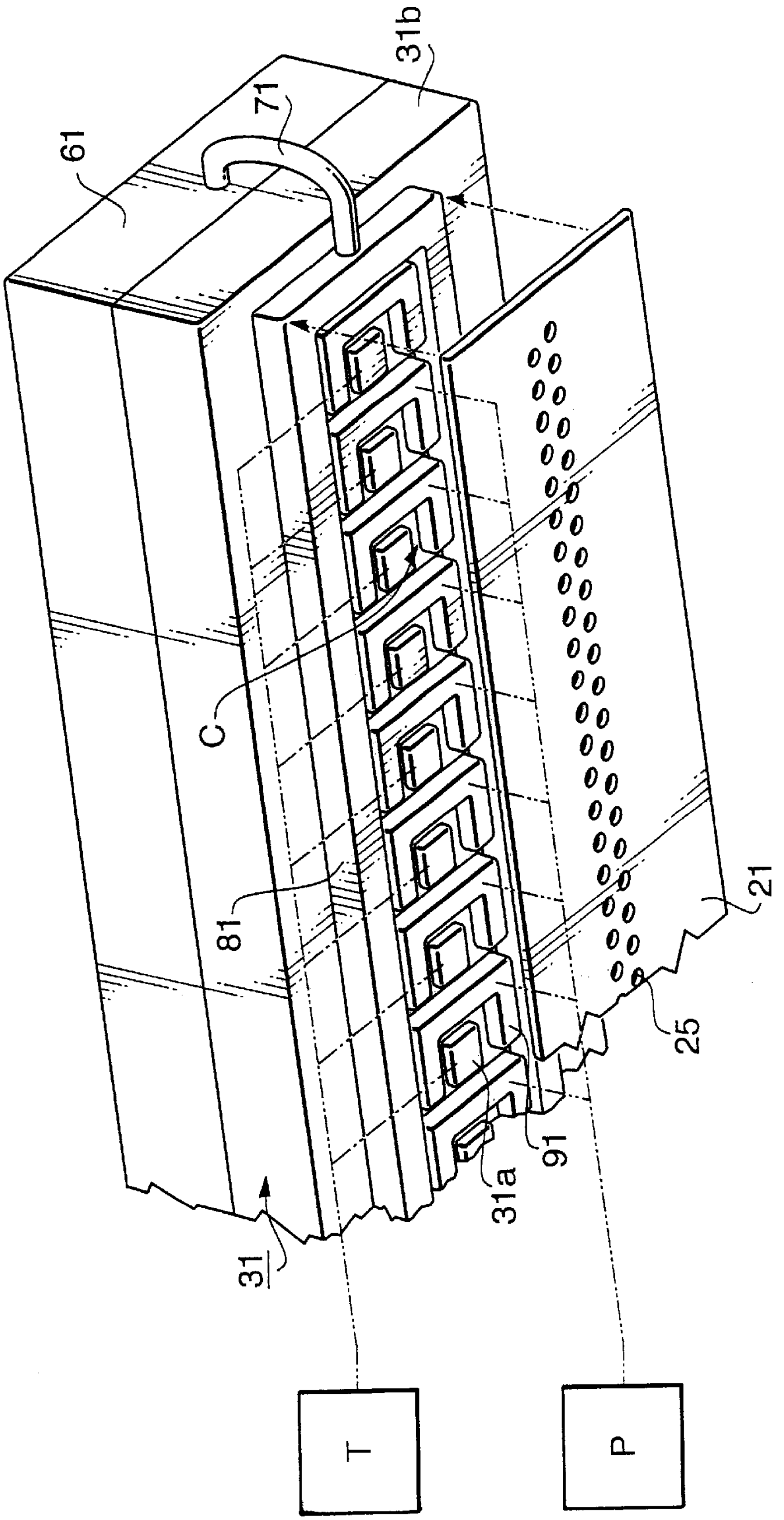
FIG. 3 is an exploded perspective view showing the ink transfer unit.
Figure 4:
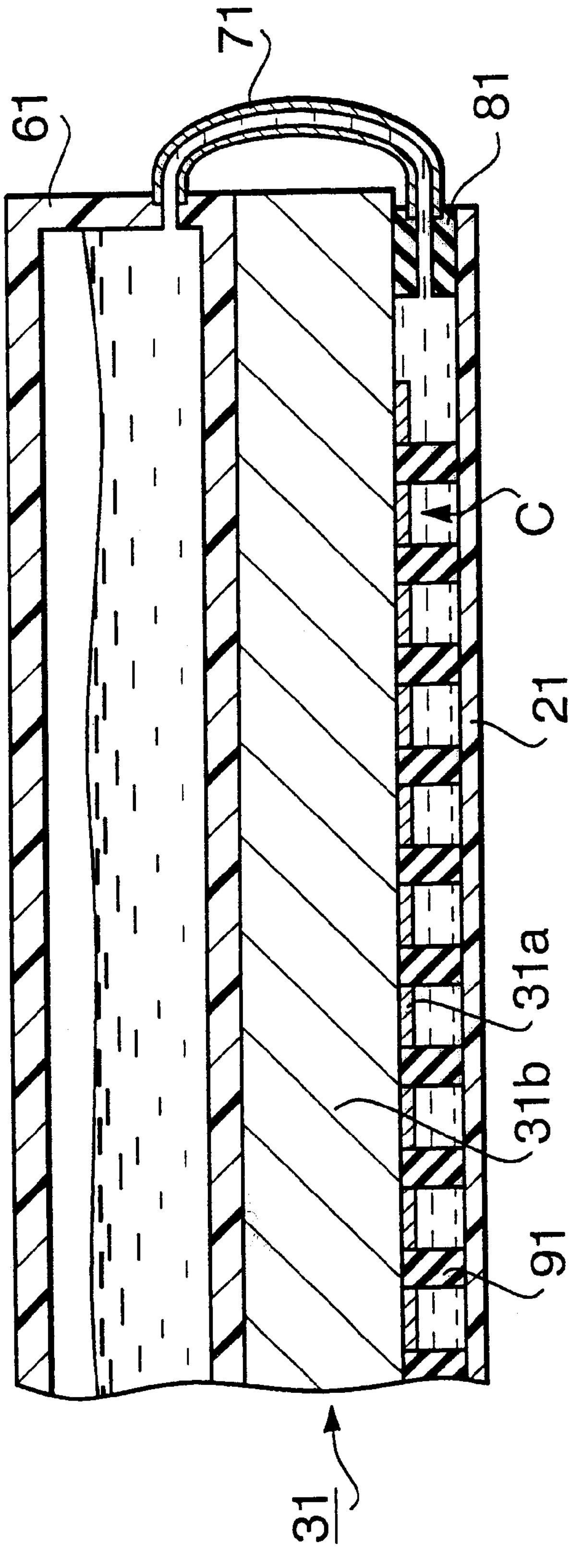
FIG. 4 is a sectional view showing the ink transfer unit.

The ink transfer unit 51 is now described with reference to FIGS. 2 through 4. Since each of the other three ink transfer units 52, 53 and 54 has the same structure as the ink transfer unit 51, the detailed description thereof is omitted. FIG. 2 is a sectional view of the ink transfer unit 51 of yellow. FIGS. 3 and 4 are an exploded perspective view and an enlarged sectional view of the ink transfer unit 51, with the platen roller 41 being removed.

The thermal head 31 includes a support plate 31*b* (fixed to the bottom of the ink tank 61) and an array of heating elements 31*a* provided at the bottom of the support plate 31*b*. The ink tank 61 is supported by a supporting member (not-shown) of the housing 11. The direction of the array is parallel to the axial direction of the platen roller 41. The heating elements 31*a* of the thermal head 31 are connected to a control circuit T (shown in FIG. 3).

As shown in FIG. 3, each heating element 31*a* is surrounded by a piezoelectric element 91 on the bottom surface of the support plate 31*b*. The piezoelectric element 91 is made of ceramics such as lead zirconate titanate (PZT). The piezoelectric elements 91 are formed on the bottom surface of the support plate 31*b*. Each of the piezoelectric elements 91 has three banks constituting three sides of a square. One piezoelectric element 91 and its adjacent piezoelectric element 91 constitute a cell in which one heating element 31*a* is located. The piezoelectric elements 91 are connected to a control circuit P. When voltage is applied to the piezoelectric element 91, the thickness (from the bottom surface of the support plate 31*b*) of the piezoelectric element 91 is changed.

A spacer 81 is provided at the bottom of the support plate 31*b*. The spacer 81 is made of a thin plate with a large square opening formed at the center thereof. The heating elements 31*a* and the piezoelectric elements 91 are housed in the square opening of the spacer 81. The film 21 is attached to the bottom surface of the spacer 81. With this, an ink space C is formed, which is surrounded by the support plate 31*b*, the film 21 and the spacer 81. The ink space C is filled with ink of yellow. The piezoelectric elements 91 contact the film 21. The capacity of the space C varies, when the thickness of the piezoelectric elements 91 is changed. As shown in FIG. 4, in order to supply ink (of yellow) to the ink space C, the ink space C is connected to the ink tank 61 at both longitudinal ends thereof via pipes 71.

Figure 5:
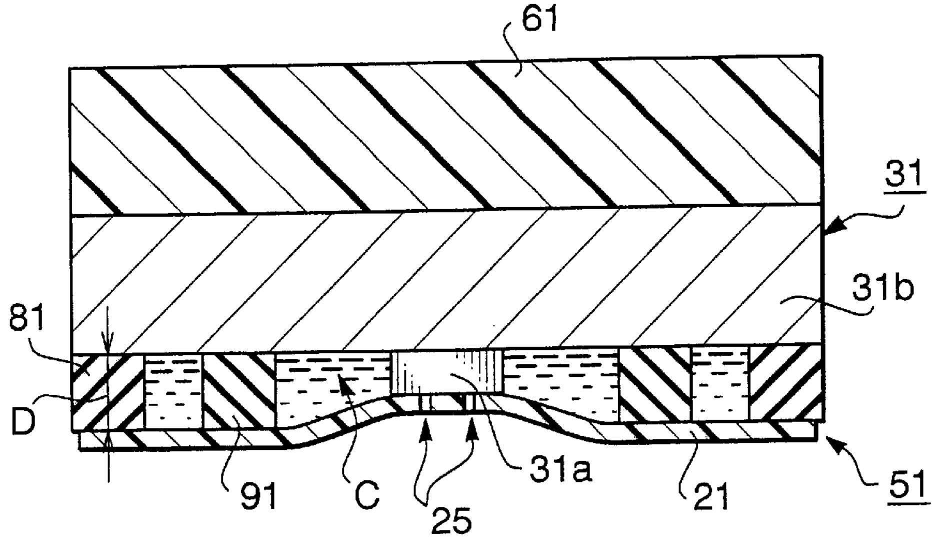
FIG. 5 is a sectional view of the ink transfer unit in a state ink is not heated.
Figure 6:
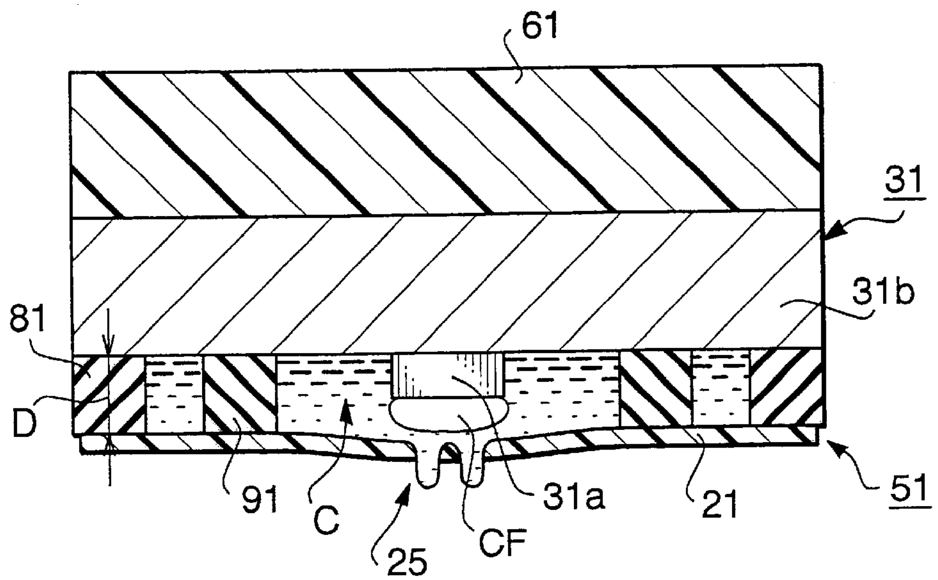
FIG. 6 is a sectional view of the ink transfer unit in a state ink is heated.

The principle of ink transfer is described with reference to FIGS. 5 and 6. FIG. 5 shows the ink transfer unit 51 in a state the ink is not heated. FIG. 6 shows the ink transfer unit in a state the ink is heated. In FIGS. 5 and 6, the platen roller 41 is not shown.

The film 21 is made of resin material such as polytetrafluorethylene (TEFLON: trademark). The film 21 has two arrays of through-holes 25. At least two through-holes 25 are faced with one heating element 31*a*. The through-holes 25 are aligned in the direction in parallel to the array of the heating element 31*a* of the thermal line head 31. The inner diameter of the through-hole 25 is small enough to prevent the transmission of the ink, under room temperature and normal pressure.

When the heating element 31*a* generates heat, it heats the ink around the heating element 31*a* and the film 21 (which is almost in contact with the heating element 31*a*). With this, the ink vaporizes and expands as indicated by 'CF' in FIG. 6. Further, the elasticity of the heated part of the film 21 decreases, so that trough-hole 25 of the heated part of the film 21 tends to expand easily. Due to the local pressure generated by the vaporization of the ink, the ink is pushed into the through-hole 25, causing the expansion of the inner diameter of the through-hole 25. With this, the ink is transmitted through the through-hole 25 of the film 21. Then, the ink is transferred to the recording sheet P which is in contact with the film 21. The ink transferred to the recording sheet P by one heating element 31*a* creates one dot of an image.

After the heating of the heating element 31*a* is stopped, the ink around the heating element 31*a* is cooled by the surrounding ink. With this, the diameter of the through-hole 25 decreases, which again prevents the transmission of the ink. Therefore, by heating the thermal head 31 thereby to form a 'line image', and by feeding the recording sheet P in a direction perpendicular to the array of the thermal head 31, a two-dimensional image is formed.

As constructed above, by heating the thermal heads 31, 32, 33 and 34 and by rotating the platen rollers 41, 42, 43 and 44, the ink of four colors are transferred to the recording sheet P. That is, a color image is obtained. It is alternatively possible to use more than four ink transfer units (or less than four) ink transfer units.

Figure 7:
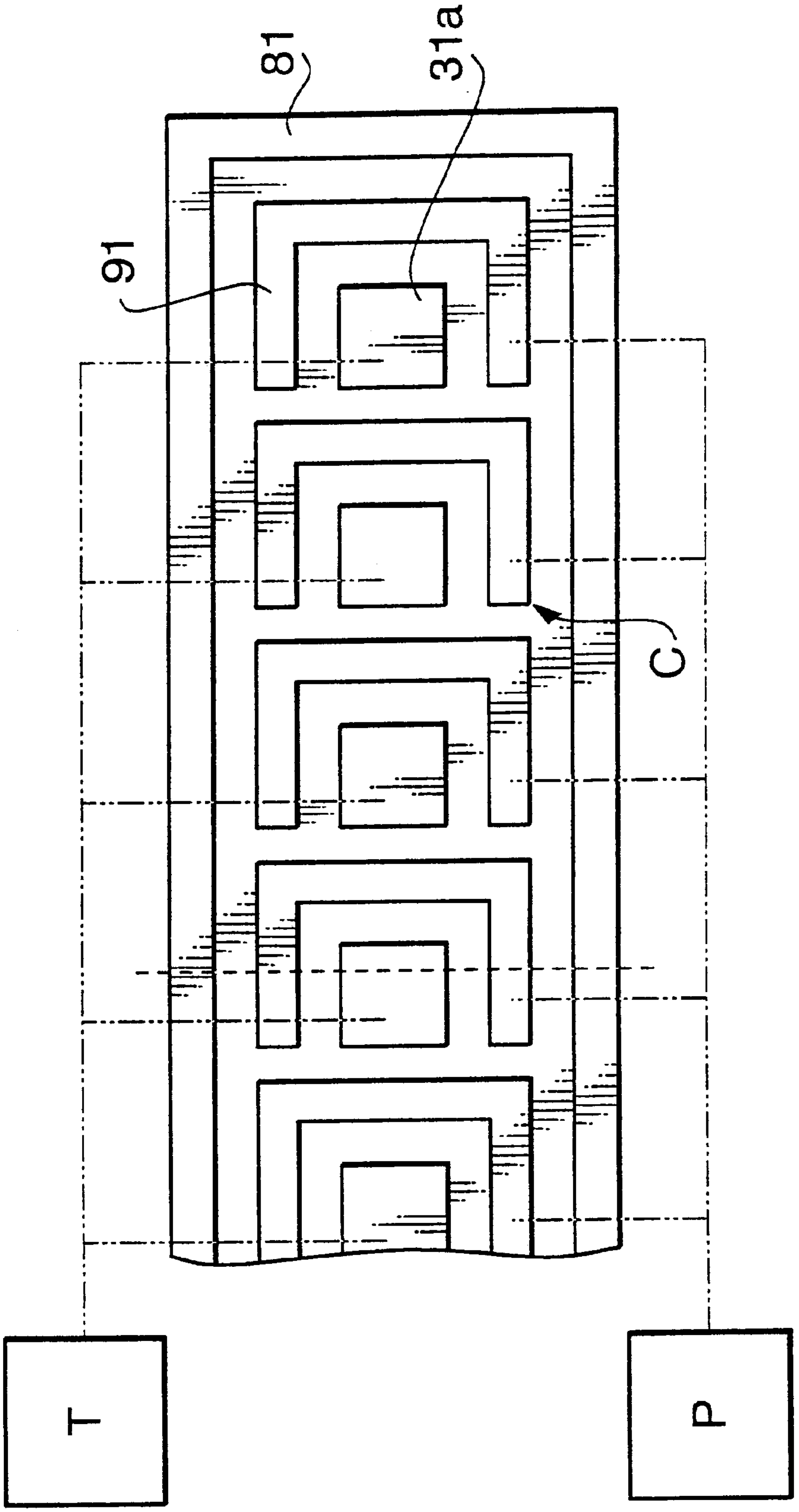
FIG. 7 is an enlarged view of a heating elements and piezoelectric elements.
Figure 8:
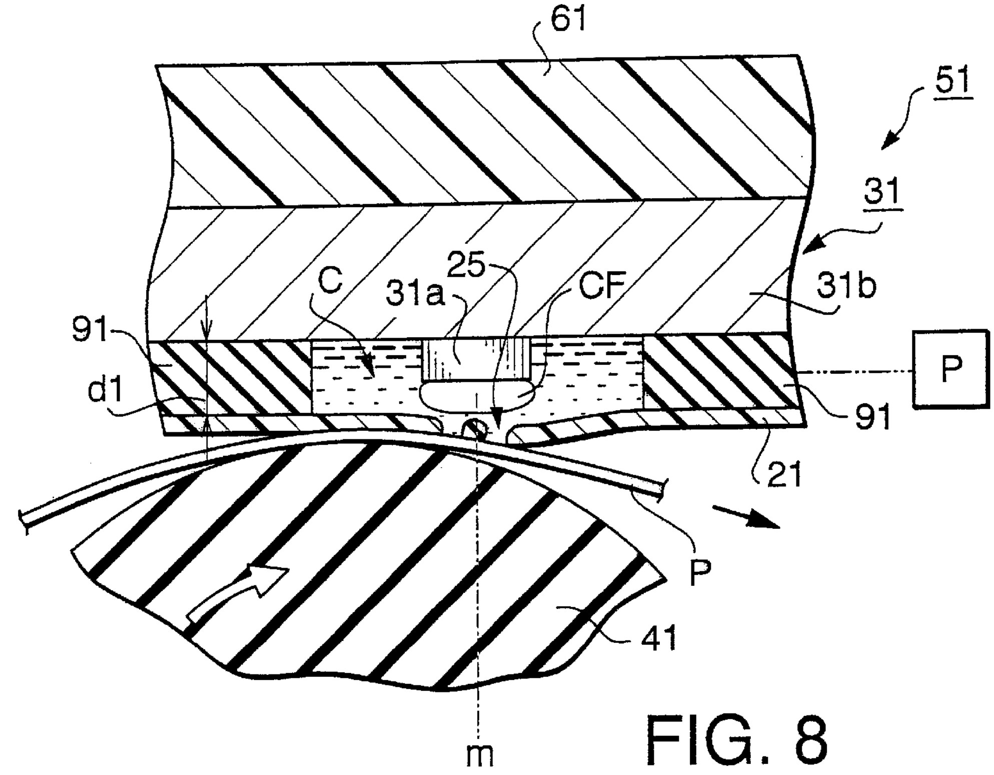
FIG. 8 is an enlarged sectional view of the ink transfer unit in a state voltage is not applied to piezoelectric elements.
Figure 9:
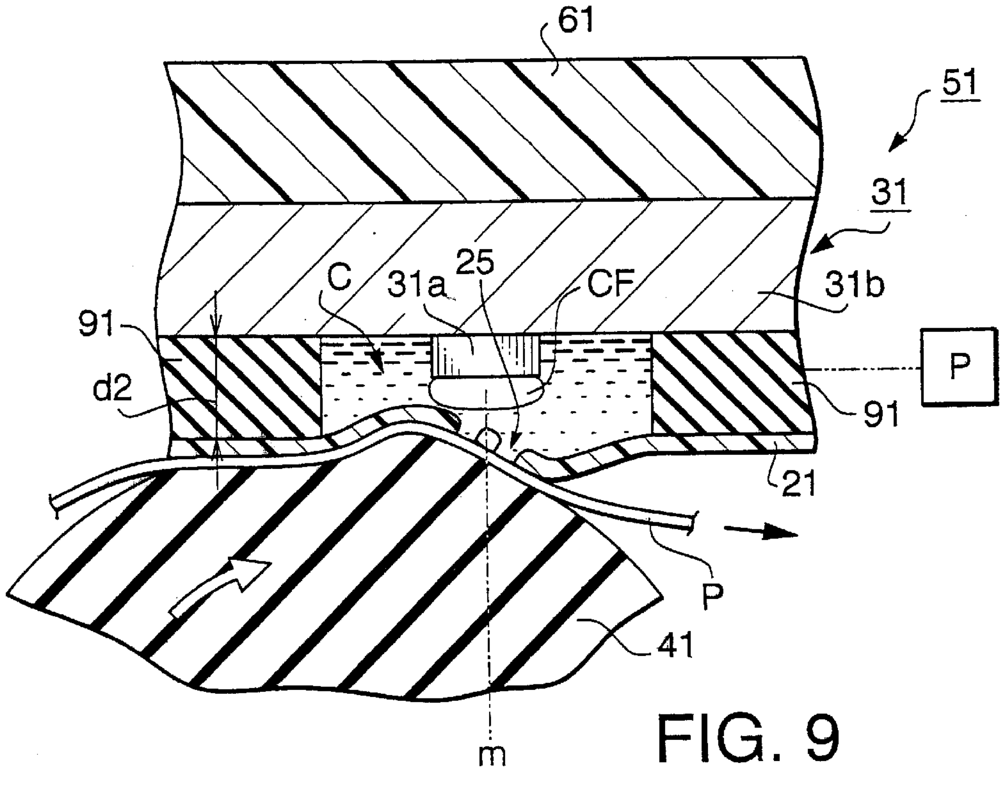
FIG. 9 is an enlarged sectional view of the ink transfer unit in a state voltage is applied to piezoelectric elements.

A capacity changer according to the first embodiment is now described. FIG. 7 shows an arrangement of the heating elements 31*a* and the piezoelectric elements 91, seen from below. FIGS. 8 and 9 are enlarged sectional views of the transfer unit 51 when no voltage is applied to the piezoelectric element 91 and when a voltage is applied to the piezoelectric element 91, respectively.

The center of the platen roller 41 is positioned upstream with respective to the center 'm' of the heating element 31*a*. The platen roller 41 urges the recording sheet P toward the film 21 by a predetermined force. When no voltage is applied to the piezoelectric element 91, the thickness d1 of the piezoelectric element 91 is almost the same as the thickness (D) of the spacer 81 (FIG. 5). If the heating element 31*a* is heated, the ink which stays in an area between the heating element 31*a* and the film 21 is transmitted through the through-hole 25.

When a voltage is applied to the piezoelectric element 91, the thickness increases from d1 to d2 (where d2 is larger than d1). As shown in FIG. 9, the upstream part of the film 21 is depressed by the platen roller 41, so that the recording sheet P is urged toward the through-holes 25 of the film 21. At the center to downstream side of the ink space C, there is room for the expansion of the ink space C. The amount of the ink which stays in an area between the heating element 31*a* and the film 21 is larger than that of FIG. 8. Thus, when the heating element 31*a* is heated, a larger amount of ink is transmitted through the through-hole 25, and is transmitted to the recording sheet P.

With such an arrangement, by changing the thickness of the piezoelectric element 91, the amount of the ink transmitted to the recording sheet can be changed. The amount of the ink transmitted to the recording sheet P corresponds to a size of a dot formed on the recording sheet P. Therefore, according to the first embodiment, the size of the dot can be changed. In the first embodiment, alternating voltage is applied to the piezoelectric element 91. With this, the thickness of the piezoelectric element 91 oscillates (that is, the capacity of the ink space C oscillates), which increases the flowability of the ink. It is alternatively possible to apply direct voltage to the piezoelectric element 91.

As described above, according to the first embodiment, by changing the capacity of the ink space, the amount of the ink transmitted to the recording sheet P can be changed. With this, the size of the dot (formed on the recording sheet) can be changed, so that the density of the image can be controlled. This is advantageous in obtaining an image of high resolution. Further, since each heating element 31*a* is surrounded by individual piezoelectric element 91, the density of each dot can be individually controlled. That is, gradation control is enabled.

Furthermore, since the film 21, 22, 23 and 24 does not allow ink to transmit at room temperature and normal pressure, the ink clogging (which may occur in a general ink jet printer) does not occur. Additionally, since the film 21, 22, 23 and 24 contacts the recording sheet P, the dispersion of the ink does not occur. In the above-described first embodiment, the piezoelectric element 91 can be replaced with an I-shaped piezoelectric element. In such a case, each heating element of the thermal head is disposed between two I-shaped piezoelectric elements.

Second Embodiment

The second embodiment is described with reference to FIGS. 10 through 12. In the second embodiment, a bimetal element 92 is used, instead of the piezoelectric element 91 of the first embodiment. The parts which are the same as those in the first embodiment carry the same reference numerals as the explanation thereof is omitted.

Figure 10:
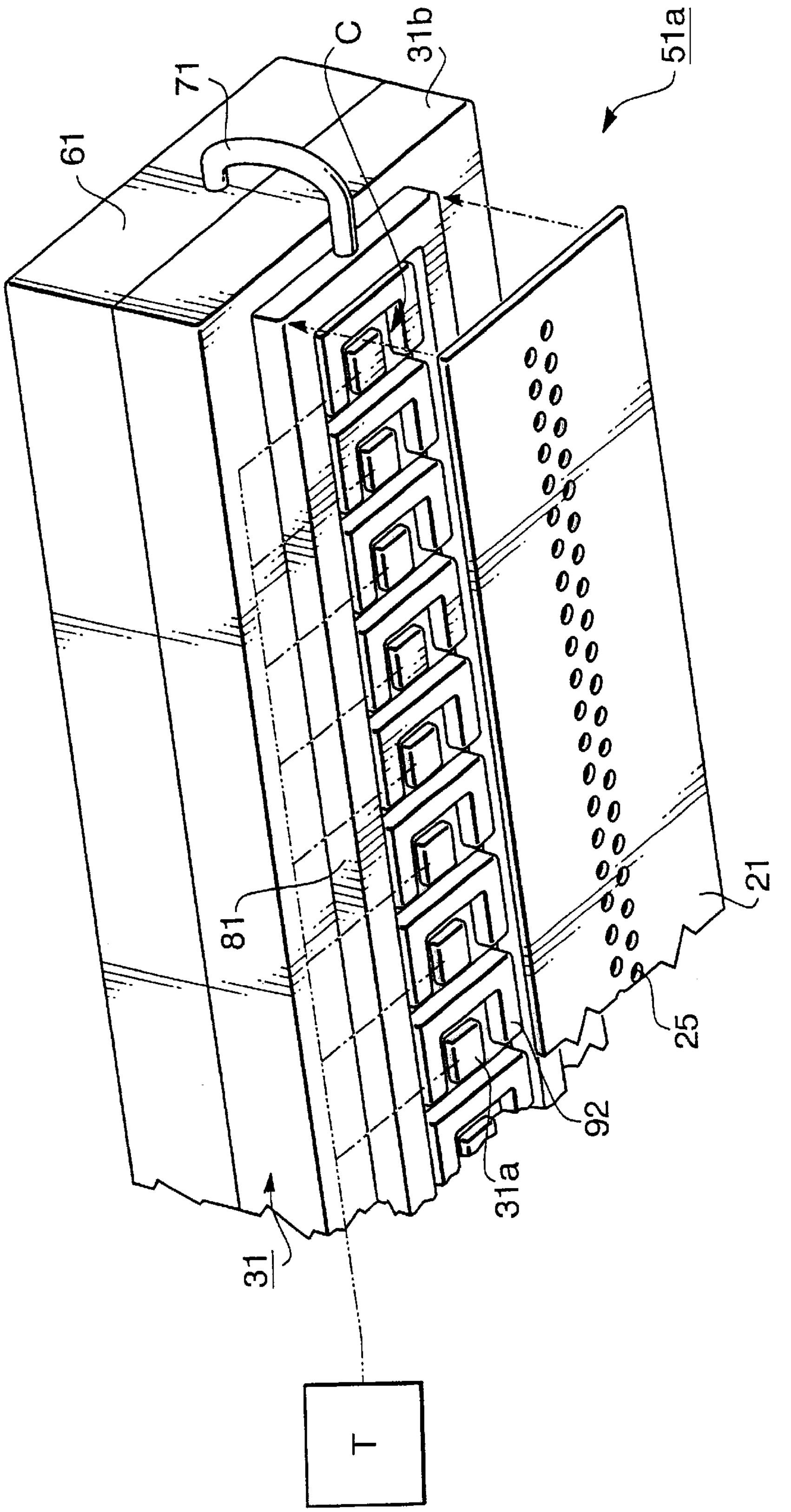
FIG. 10 is an exploded perspective view of an ink transfer unit according to a second embodiment.

FIG. 10 is an exploded perspective view of an ink transfer unit 51*a* of the second embodiment, with a platen roller thereof being removed. As shown in FIG. 10, each heating element 31*a* of the thermal head 31 is surrounded by a bimetal element 92. The bimetal element 92 has three banks constituting three sides of a square. One bimetal element 92 and its adjacent bimetal element 92 constitute a cell in which one heating element 31*a* is located. Different from the first embodiment, the bimetal element 92 is not actively controlled. The bimetal element 92 deforms according to the temperature of the thermal head 31.

Figure 11:
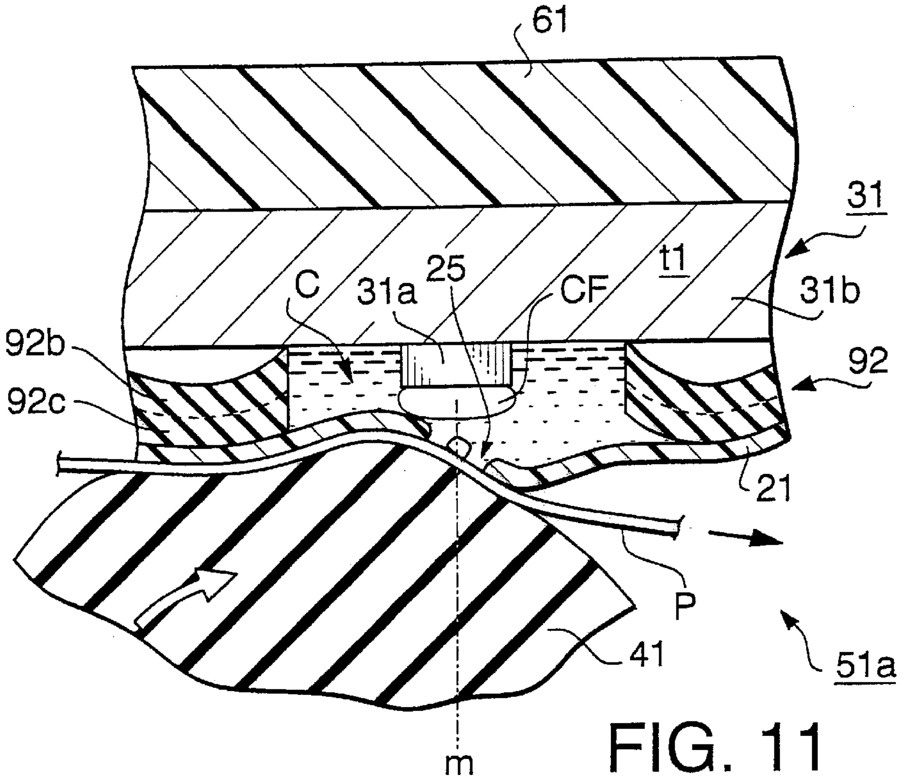
FIG. 11 is a sectional view of the ink transfer unit in a state a thermal head is at a relatively low temperature.
Figure 12:
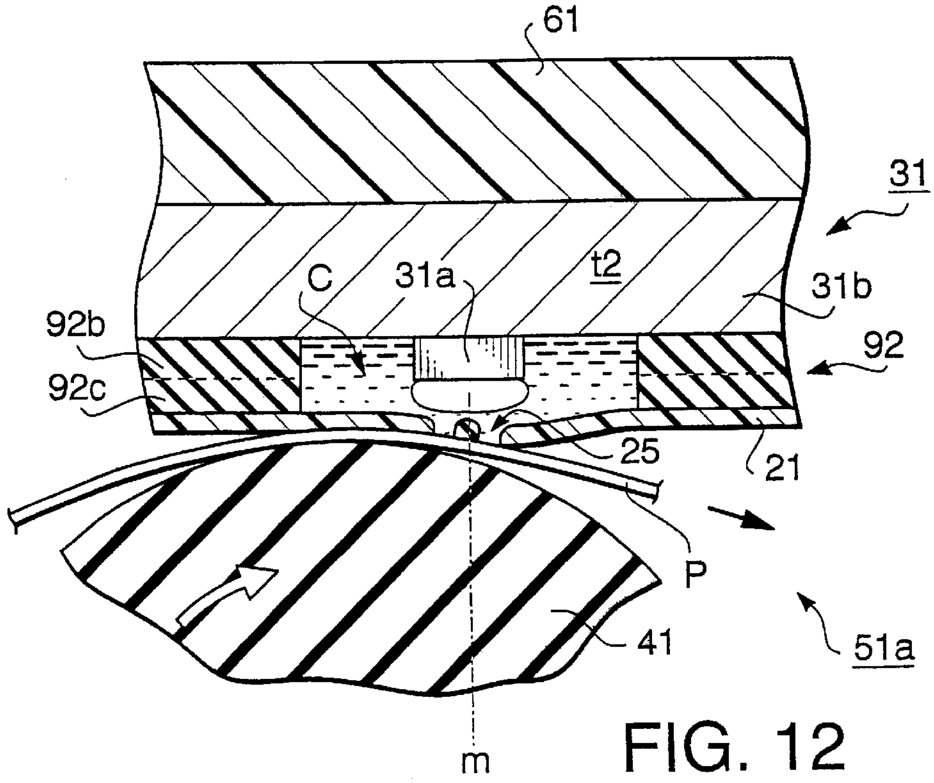
FIG. 12 is a sectional view of the ink transfer unit in a state a thermal head is at a relatively high temperature.

FIGS. 11 and 12 show the ink transfer unit 51*a* when the temperature of the heating element 31*a* is relatively low and relatively high, respectively. The bimetal element 92 includes two metal layers 92*b* and 92*c* having different thermal expansibility. For example, the bimetal element 92 is made of stainless plate and aluminum alloy plate laminated with each other. The metal layer 92*b* with a higher thermal expansibility is faced with the support plate 31*b* of the thermal head 31. The metal layer 92*c* with a lower thermal expansibility faces the film 21.

When the temperature of the heating element 31*a* is relatively low (for example, at a room temperature), the bimetal element 92 is deformed as shown in FIG. 11. The upstream part of the film 21 is depressed by the platen roller 41, so that the recording sheet P is urged toward the through-holes 25 of the film 21. The center to downstream side of the ink space C expands as shown in FIG. 11, due to the deformation of the bimetal element 92. In this state, a relatively large amount of the ink stays in an area between the heating element 31*a* and the through-hole 25. That is, when the heating element 31*a* is heated, a relatively large amount of ink is transmitted through the through-hole 25, and is transmitted to the recording sheet P.

Conversely, when the temperature of the thermal head 31 is relatively high (for example, at 60° C.), the metal layer 92*b* with a higher thermal expansibility expands instead of the other metal layer 92*c*. With this, the bimetal element 92 becomes rather flat, as shown in FIG. 12. Accordingly, the capacity of the ink space C decreases. In this state, the amount of the ink which stays in an area between the heating element 31*a* and the film 21 is smaller than that of FIG. 11. Thus, when the heating element 31*a* is heated, a smaller amount of ink is transmitted through the through-hole 25, and is transmitted to the recording sheet P.

The second embodiment has a following advantage. Generally, after the printer is continuously used for a long time, the temperature of the thermal head 31 may increase due to heat accumulation. In this state, the viscosity of the ink may decrease, increasing the flowability of the ink. Further, the elasticity of the film 21 tends to decrease, so that the through-hole 25 tends to expand easily. Accordingly, there is a possibility that an excessive amount of the ink is transmitted to the recording sheet P. However, according to the second embodiment, when the temperature of the thermal head is high, the increase in the ink flowability (and the deformability of the film) is balanced by the decrease of the ink space. Therefore, the amount of the ink transmitted to the recording sheet P is kept constant. That is, the dot size can be kept constant, irrespective of the heat accumulation of the thermal head 31. It is advantageous in obtaining an image of high resolution. For example, since the dot size is stabilized, it is possible to control the gradation by varying the heating time of the heating elements of the thermal head.

The ink transfer unit 51*a* of the second embodiment can be assembled in a color printer (FIG. 1) as in the first embodiment. Further, in the second embodiment, the bimetal element 92 can be replaced with an I-shaped bimetal element. In such case, each heating element of the thermal head is disposed between two I-shaped bimetal elements. In the second embodiment, a shape memory alloy can be used, instead of the bimetal element.

Third Embodiment

The third embodiment is described with reference to FIGS. 13 through 15. In the third embodiment, the amount of the ink supplied to the ink space C is changed, in order to change the amount of the ink transmitted to the recording sheet P.

Figure 13:
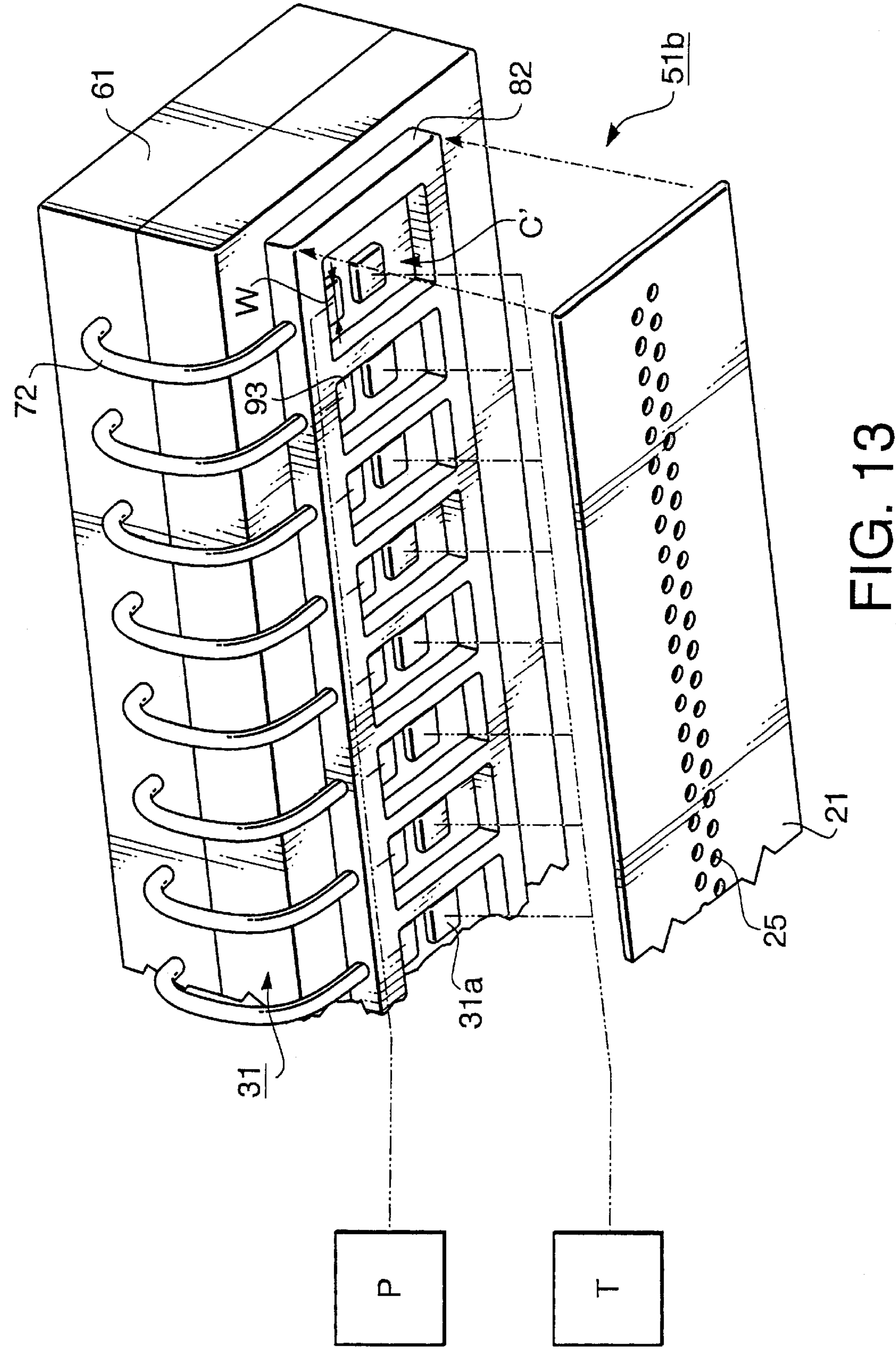
FIG. 13 is an enlarged view showing an ink transfer unit according to a third embodiment.

FIG. 13 shows ink transfer unit 51*b* according to the third embodiment. As shown in FIG. 13, a spacer 82 of the third embodiment has a plurality of square openings (cells) each of which surrounds one heating element 31*a*. The film 21 is attached to the bottom surface of the spacer 82. That is, ink spaces C' of the third embodiment completely separated from each other, so that each heating element 31*a* is individually housed in a respective ink space C'. The respective ink spaces C' are connected to the ink tank 61 via pipes 72. That is, each ink space C' is supplied with ink individually. As the ink in each ink space C' is consumed, the ink is supplied to the ink space C' (via the pipe 72) constantly, so that the ink space C' is filled with the ink.

In the ink space C', a piezoelectric element 93 is provided in the vicinity of the heating element 31*a*. The piezoelectric element 91 is made of ceramics such as lead zirconate titanate (PZT). The piezoelectric element 91 is located between the thermal head 31*a* and inlet port 82*b* (FIG. 14A) connected to the ink the pipe 72. Each heating element 31*a* is connected to the control circuit T, while each piezoelectric element 93 is connected to the control circuit P. When a voltage is applied to the piezoelectric element 93, the width W (in the direction of the array of the heating elements 31*a*) of the piezoelectric element 93 is changed.

Figure 14A:
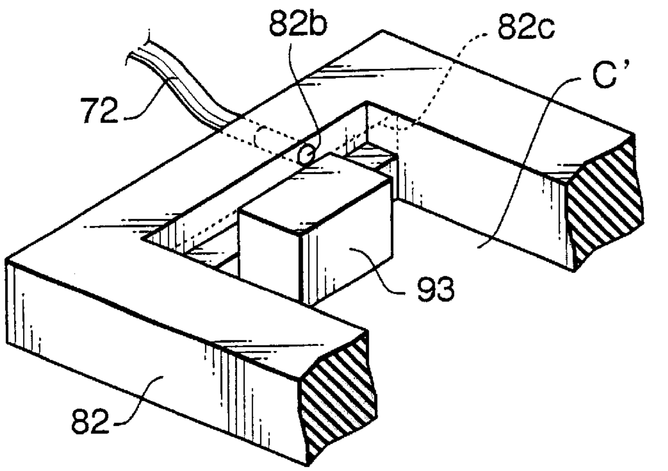
FIGS. 14A and 14B are respective sectional views of the ink transfer unit in a state no voltage is applied to piezoelectric elements.
Figure 14B:
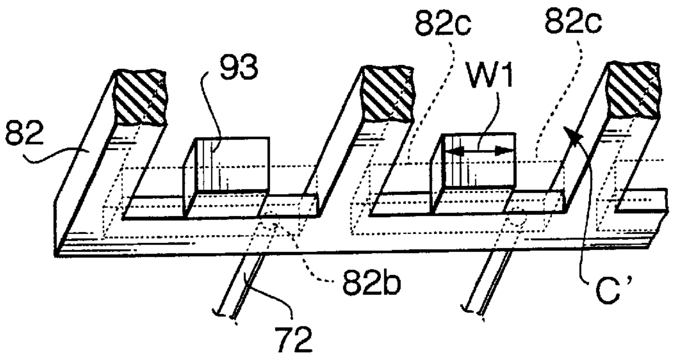
Figure 15:
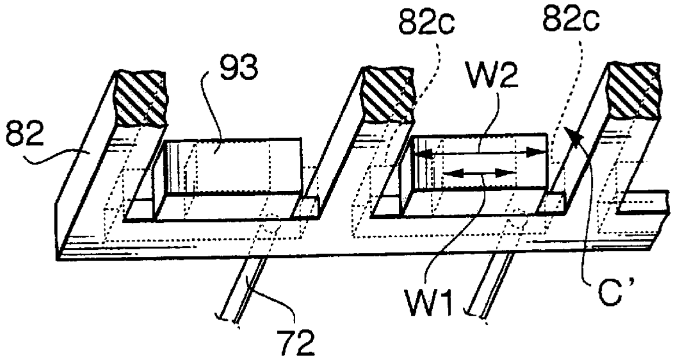
FIG. 15 is a sectional view of the ink transfer unit in a state a voltage is applied to piezoelectric elements.

FIG. 14A is a perspective view of the ink space C' when no voltage is applied to the piezoelectric element 93. FIG. 14B is a perspective view of the ink space C' seen from the opposite direction to the FIG. 14A. As shown in FIGS. 14A and 14B, an inlet port 82*b* (connected to the pipe 72) is formed at the pipe side of the spacer 82. The piezoelectric element 93 is located in front of the inlet port 82*b*. The ink supplied from the inlet port 82*b* flows in the ink space C' through both side areas 82*c* of the piezoelectric element 93. When a voltage is applied to the piezoelectric element 93 as shown in FIG. 15, the piezoelectric element 93 laterally expands so that the width thereof changes from W1 to W2. As the piezoelectric element 93 expands, the area of both side areas 82*c* decreases. Thus, the amount of the ink supplied to the ink space C' decreases.

As the amount of the ink supplied to the ink space C decreases, the amount of ink transmitted through the through-hole 25 to the recording sheet P also decreases.

With such an arrangement, according to the third embodiment, by changing the width of the piezoelectric element 93, the amount of the ink transmitted to the recording sheet can be changed. With this, the size of the dot (formed on the recording sheet) can be changed, so that the density of an image can be controlled. Further, since the amount of the ink supplied to the individual ink space C' is controlled, the print density can be individually controlled. That is, the gradation can be controlled.

In the third embodiment, alternating voltage is applied to the piezoelectric element 93. With this, the width of the piezoelectric element 93 oscillates, which increases the flowability of the ink. It is alternatively possible to apply direct voltage to the piezoelectric element 93. The ink transfer unit of the third embodiment can be assembled in a color printer (FIG. 1) as in the first embodiment.

Fourth Embodiment

Figure 16:
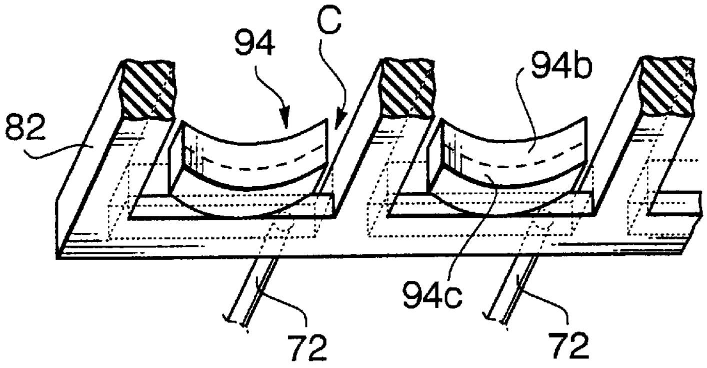
FIG. 16 is an enlarged view showing a spacer and a bimetal element according to the fourth embodiment.

The fourth embodiment is described with reference to FIGS. 16 through 18. The fourth embodiment is different from the third embodiment in that the forth embodiment uses bimetal elements 94 instead of the piezoelectric elements 93 of the third embodiment.

As in the third embodiment, the spacer 82 has a plurality of openings (cells) each of which surrounds one heating element 31*a* (FIG. 13). FIG. 16 is a bottom perspective view showing the spacer 82 and the bimetal element 94. The structure of the ink space C' is the same as the third embodiment.

The bimetal element 94 is provided in front of the inlet port 82*b*. The bimetal element 94 include a metal plates 94*b* having a high thermal expansibility (for example, aluminum alloy) and a metal plate 94*c* having low thermal expansibility (for example, stainless-steel).

Figure 17:
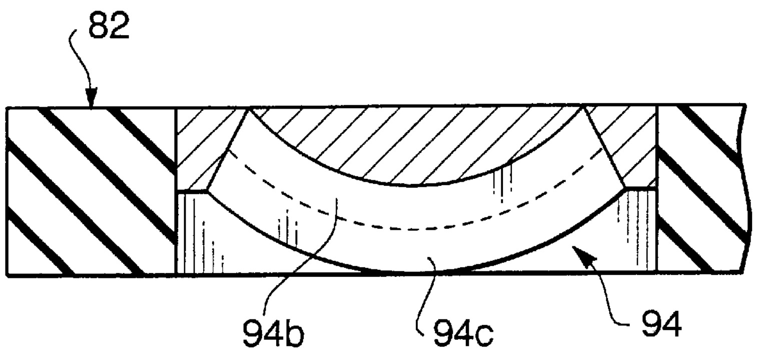
FIG. 17 is an enlarged view showing a spacer and a bimetal element in a state the thermal head is at a relatively low temperature.

When the temperature of the thermal head 31 is relatively low (for example, at room temperature), the bimetal 94 is deformed as shown in FIG. 17. In this state, an area through which the ink is supplied to the ink space (shown by hatching in FIG. 17) is relatively large.

Figure 18:
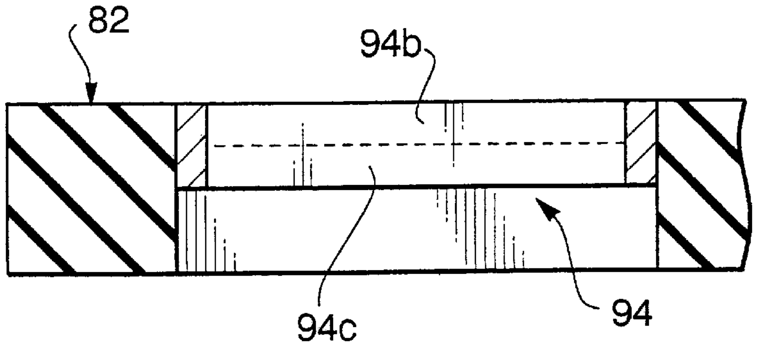
FIG. 18 is a enlarged view showing the spacer and the bimetal element in a state the thermal head is at a relatively high temperature.

Conversely, when the temperature of the thermal head 31 is relatively high (for example, at 60° C.), the metal plate 94*b* (with a high thermal expansibility) expands instead of the metal plate 94*c*, so that the bimetal plate 94 becomes flats as shown in FIG. 18. In this state, an area through which the ink is supplied to the ink space (shown by hatching in FIG. 18) is relatively small.

That is, the amount of the ink supplied to the ink space C' decreases as the temperature of the thermal head 31 increases. Accordingly, the fourth embodiment has the same advantage as the second embodiment. That is, even when the temperature of the thermal head is relatively high (that is, the flowability of the ink is increased), the amount of the ink transmitted to the recording sheet is kept constant. Thus, the dot size can be kept constant. This is advantageous in obtaining an image of high resolution.

The ink transfer unit of the fourth embodiment can be assembled in a color printer (FIG. 1) as in the first embodiment. In the fourth embodiment, the bimetal element can be replaced by a shape memory alloy.

As described above, in the first and second embodiments, the capacity of the ink space is varied. Conversely, in the third and fourth embodiments, the amount of the ink stored in the ink space is varied.

Although the ink transfer printer is described herein with respect to the preferred embodiments, many modifications and changes can be made without departing from the spirit and scope of the invention.

The present disclosure relates to subject matters contained in Japanese Patent Application No. HEI 10-16324, filed on Jan. 12, 1998, which is expressly incorporated herein by reference in their entirety.

What is claimed is:

1. An ink transfer printer comprising:

a thermal head having an array of heating elements;

a film having a plurality of through-holes facing said array of heating elements;

an ink space formed between said thermal head and said film, in which ink can be held; and a contact mechanism which brings a recording medium in contact with said film;

wherein, when a heating element of said array of heating elements generates heat, said ink is transmitted through a through-hole of said plurality of through-holes and is transferred to said recording medium;

wherein an ink amount controller is provided in said ink space, which controls the amount of ink transmitted through said through-hole to said recording medium, said ink amount controller comprising a capacity changer which changes a capacity of said ink space.

2. The ink transfer printer according to claim 1, wherein said capacity changer is driven independently with respect to said thermal head.

3. The ink transfer printer according to claim 1, said capacity changer comprising at least one piezoelectric element, wherein, when a dimension of said piezoelectric element changes, a capacity of said ink space is changed.

4. The ink transfer printer according to claim 3, said capacity changer comprising a plurality of piezoelectric elements, said plurality of piezoelectric elements being arranged along said array of heating elements of said thermal head.

5. The ink transfer printer according to claim 4, wherein a respective piezoelectric element of said plurality of piezoelectric elements surrounds a respective heating element of said array of heating elements.

6. The ink transfer printer according to claim 4, said thermal head comprising a support plate on which said array of heating elements are supported, wherein said piezoelectric element is provide on said support plate, and wherein a thickness of said piezoelectric element defines one dimension of said ink space.

7. The ink transfer printer according to claim 1, wherein said capacity changer decreases a capacity of said ink space, as a temperature of said thermal head increases.

8. The ink transfer printer according to claim 7, said capacity changer comprising heat-sensitive member, which changes its form according to its temperature, wherein, when said heat-sensitive member changes its form, a capacity of said ink space is changed.

9. The ink transfer printer according to claim 8, said heat-sensitive member comprising bimetal material.

10. The ink transfer printer according to claim 8, wherein a plurality of heat-sensitive members are arranged along said array of heating elements of said thermal head.

11. The ink transfer printer according to claim 1, wherein said through-hole of said plurality of through holes allows the transmission of said ink when said through-hole is heated, and wherein said through-hole prohibits the transmission of said ink when said through-hole is unheated.

12. An ink transfer printer comprising:

a thermal head having an array of heating elements;

a film having a plurality of through-holes facing said array of heating elements;

an ink space formed between said thermal head and said film, in which ink can be held;

a contact mechanism which brings a recording medium in contact with said film; and an ink container which supplies ink to said ink space;

wherein, when a heating element of said array of heating elements generates heat, said ink is transmitted through a through-hole of said plurality of through-holes and is transferred to said recording medium;

wherein an ink amount controller is provided in said ink space, which controls the amount of ink transmitted through said through-hole to said recording medium; and wherein said ink amount controller comprises an ink supply regulator which changes an amount of ink supplied to said ink space from said ink container.

13. The ink transfer printer according to claim 12, wherein said ink supply regulator is provided in the vicinity of an inlet port of ink through which ink is supplied to said ink space.

14. The ink transfer printer according to claim 13, wherein said ink supply regulator deforms so as to change an area through which ink supplied from said inlet port flows in said ink space.

15. The ink transfer printer according to claim 12, wherein said ink supply regulator is driven independently with respect to said thermal head.

16. The ink transfer printer according to claim 15, wherein said ink supply regulator comprising at least one piezoelectric element.

17. The ink transfer printer according to claim 12, wherein said ink supply regulator comprising at least one heat-sensitive member.

18. The ink transfer printer according to claim 17, said heat-sensitive member comprising a bimetal material.

19. The ink transfer printer according to claim 12, wherein said ink space is divided into a plurality of sections corresponding to dots to be formed on said recording medium, and wherein said ink supply regulator is arranged to change an amount of ink supplied to each section of said plurality of sections of said ink space.

* * * * *